Patented May 26, 1936

2,041,705

UNITED STATES PATENT OFFICE 2,041,705

AMINO DERIVATIVES OF O-NITRO-PHENYL-LACTIC AND THIOLACTIC ACIDS

Norman Hulton Haddock and Arnold Kershaw, Blackley, Manchester, England, assignors to Imperial Chemical Industries Limited, a corporation of Great Britain No Drawing. Application October 29, 1934, Serial No. 750,603. In Great Britain November 15, 1933

4 Claims. (Cl. 260—109)

In the British Specification No. 415,753 there is described the production of new dyestuffs.

For the production of certain of these dyestuffs we have devised new intermediates and the present invention relates to the manufacture of such.

According to our invention we make diazotizable derivatives of lactic acid or thiolactic acid and their homologues by acting on a phenol or a thiophenol with a halogen fatty acid and thereafter treating the resultant condensation product with a nitrating or reducing or hydrolyzing agent or with more than one of these agents as may be necessary, it being understood that in the resultant intermediate body there is always a nitro group ortho to the lactic acid or thiolactic acid residues.

The following examples illustrate but do not limit the invention. The parts are by weight.

Example 1

2-nitro-4-aminophenylthiolactic acid 100 parts of 2:4-dinitrochlorobenzene are dissolved in 1000 parts of warm alcohol and 220 parts of 30% sodium hydrogen sulphide added during ¼ hour at 25–30° C. The mixture is stirred for a further ¼ hour and then diluted with 2000 parts of cold water. 2:4-dinitrophenylmercaptan is precipitated by addition of hydrochloric acid and is filtered and washed with cold water. The wet solid is suspended in 1000 parts of water and 54 parts of soda ash added. 80 parts of α-bromopropionic acid, previously neutralized by sodium carbonate are now added and the temperature is raised to 90° during ½ hour. After a further ¼ hour at 90° the mixture is allowed to cool and filtered from insoluble impurities. It is then treated with 300 parts of salt. The precipitated sodium salt of 2:4-dinitrophenylthiolactic acid is filtered and converted to free acid by means of mineral acid. It forms a pinkish powder, M. P. 157° C. Recrystallization from 40% acetic acid raised the M. P. to 159° C.

50 parts of the above crude dinitro compound are suspended in 500 parts of water and dissolved at 80° by addition of ammonia. A solution of 65 parts of sodium sulphide crystals is now added at 80° during ½ hour and after stirring a further ¼ hour and the mixture rendered strongly acid by addition of 160 parts of 35% hydrochloric acid. Tarry impurities are removed by filtration and the filtrate is neutralized to Congo red by careful addition of ammonia. The orange coloured 2-nitro-4-aminophenylthiolactic acid is filtered off and may be purified by recrystallization from hot water. It has M. P. 141–142° C.

Example 2

Preparation of 2-nitro-4-aminophenyl lactic acid (2'-nitro-4'-amino-phenoxy-α-propionic acid)

38 parts of p-acetylaminophenol are dissolved in a solution of 12 parts of caustic soda in 87 parts of water. To this solution is added the solution of sodium α-bromopropionate prepared by adding soda ash to a mixture of 42 parts of α-bromopropionic acid and 50 parts of water till neutral to litmus. The whole is then stirred and heated during one hour to 80° C., and maintained at 80° with stirring for two hours. The mixture is then allowed to cool, filtered, acidified and stirred until the gummy product thrown out by the acid has solidified. The solid is removed and dried. On recrystallizing from water it has a melting point of 173° C.

To 600 parts of sulphuric acid stirred below 10° C. are added 67 parts of the above p-acetylaminophenyl lactic acid. A mixture of 20 parts of 94% nitric acid and 60 parts of sulphuric acid is added to the above solution with stirring, below 10° C. When all is added, the nitration mixture is stirred for a further hour and then poured on ice, whereby the desired product separates as a fine powder. It has M. P. 186° C. which runs to 195° C. when recrystallized from water.

76 parts of the above acetyl compound, 24 parts of caustic soda and 125 parts of water are boiled together under reflux for 1.5 hours, then diluted with an equal volume of water, cooled and 30 parts of concentrated hydrochloric acid added, whereby the desired product separates. Recrystallized from water it has M. P. 153° C.

The compound above obtained is 2-nitro-4-amino phenyl lactic acid. According to the nomenclature employed by some authorities for compounds of this series, it may also be named 2'-nitro-4'-amino-phenoxy-α-propionic acid.

In general, it will be understood that the compounds described in the above examples may be represented by the general formula

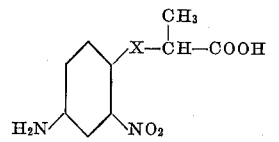

wherein X represents an atom of the group consisting of oxygen and sulphur.

We claim:
1. A compound, of the general formula

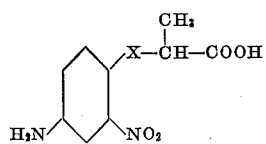

wherein X represents a member of the group consisting of O and S.
2. 2-nitro-4-aminophenyl-lactic acid.
3. 2-nitro-4-aminophenyl-thiolactic acid.
4. A process for producing 2-nitro-4-aminophenyl-lactic acid which comprises reacting p-acetylaminophenol, in aqueous alkaline solution, with an alkai-metal salt of $\alpha$-bromo-propionic acid, mono-nitrating the intermediate p-acetylamino-phenyl-lactic acid, and hydrolyzing the resulting p-acetylamino-o-nitro-phenyl-lactic acid.

NORMAN HULTON HADDOCK.
ARNOLD KERSHAW.